United States Patent
Lee et al.

(10) Patent No.: US 9,111,376 B2
(45) Date of Patent: Aug. 18, 2015

(54) IMAGE PROCESSING METHOD AND APPARATUS FOR 3D VIDEO

(71) Applicant: SAMSUNG ELECTRONICS CO., LTD, Suwon-si (KR)

(72) Inventors: Seok Lee, Hwaseong-si (KR); Ho Cheon Wey, Seongnam-si (KR); Seung Sin Lee, Yongin-si (KR); Jae Joon Lee, Seoul (KR); Kwan Jung Oh, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 162 days.

(21) Appl. No.: 13/750,072

(22) Filed: Jan. 25, 2013

(65) Prior Publication Data

US 2013/0194255 A1   Aug. 1, 2013

Related U.S. Application Data

(60) Provisional application No. 61/590,895, filed on Jan. 26, 2012.

(30) Foreign Application Priority Data

Apr. 16, 2012  (KR) .................. 10-2012-0039313
Jul. 6, 2012   (KR) .................. 10-2012-0073992
Dec. 20, 2012  (KR) .................. 10-2012-0149850
Jan. 23, 2013  (KR) .................. 10-2013-0007551

(51) Int. Cl.
*G06T 15/00*   (2011.01)
*H04N 13/00*   (2006.01)
*H04N 19/597*  (2014.01)

(52) U.S. Cl.
CPC ............ *G06T 15/00* (2013.01); *H04N 13/0018* (2013.01); *H04N 13/0022* (2013.01); *H04N 13/0029* (2013.01); *H04N 13/0048* (2013.01);
(Continued)

(58) Field of Classification Search
CPC ............... G06T 15/00; H04N 13/0018; H04N 13/0022; H04N 19/00769; H04N 13/0048; H04N 2213/003; H04N 13/0029
USPC ........... 345/419, 629; 382/103, 154, 294, 299
See application file for complete search history.

(56) References Cited

U.S. PATENT DOCUMENTS 6,563,513 B1   5/2003  Yu et al.
8,248,410 B2*  8/2012  Tan ............... 345/420
8,374,238 B2*  2/2013  Xiong et al. ........... 375/240.11

(Continued)

FOREIGN PATENT DOCUMENTS

KR  10-2009-0039720   4/2009
KR  10-2009-0039759   4/2009

(Continued)

OTHER PUBLICATIONS

International Search Report mailed May 30, 2013 in corresponding International Patent Application PCT/KR2013/000618.

*Primary Examiner* — Phu K Nguyen
(74) *Attorney, Agent, or Firm* — Staas & Halsey LLP

(57) ABSTRACT

An image processing method and apparatus for three-dimensional (3D) video is provided. The image processing method may include identifying a first depth image, and upsampling the first depth image to a second depth image having expanded foreground area than the first depth image.

29 Claims, 10 Drawing Sheets

(52) U.S. Cl.
CPC ........ *H04N 19/597* (2014.11); *H04N 2213/003* (2013.01)

(56) References Cited

U.S. PATENT DOCUMENTS

| | | | | |
|---|---|---|---|---|
| 8,744,121 | B2 * | 6/2014 | Polzin et al. | 382/103 |
| 8,781,161 | B2 * | 7/2014 | Kim et al. | 382/103 |
| 8,781,256 | B2 * | 7/2014 | Lim et al. | 382/294 |
| 8,837,816 | B2 * | 9/2014 | Chang et al. | 382/154 |
| 8,891,905 | B2 * | 11/2014 | Cui | 382/299 |
| 2006/0114993 | A1 | 6/2006 | Xiong et al. | |
| 2006/0133472 | A1 | 6/2006 | Bruls et al. | |
| 2007/0160153 | A1 | 7/2007 | Sullivan | |
| 2010/0141651 | A1 | 6/2010 | Tan | |
| 2010/0220796 | A1 | 9/2010 | Yin et al. | |

FOREIGN PATENT DOCUMENTS

| | | |
|---|---|---|
| KR | 10-2009-0076020 | 7/2009 |
| KR | 10-2012-0003147 | 1/2012 |
| WO | 2011/094047 A1 | 8/2011 |

\* cited by examiner

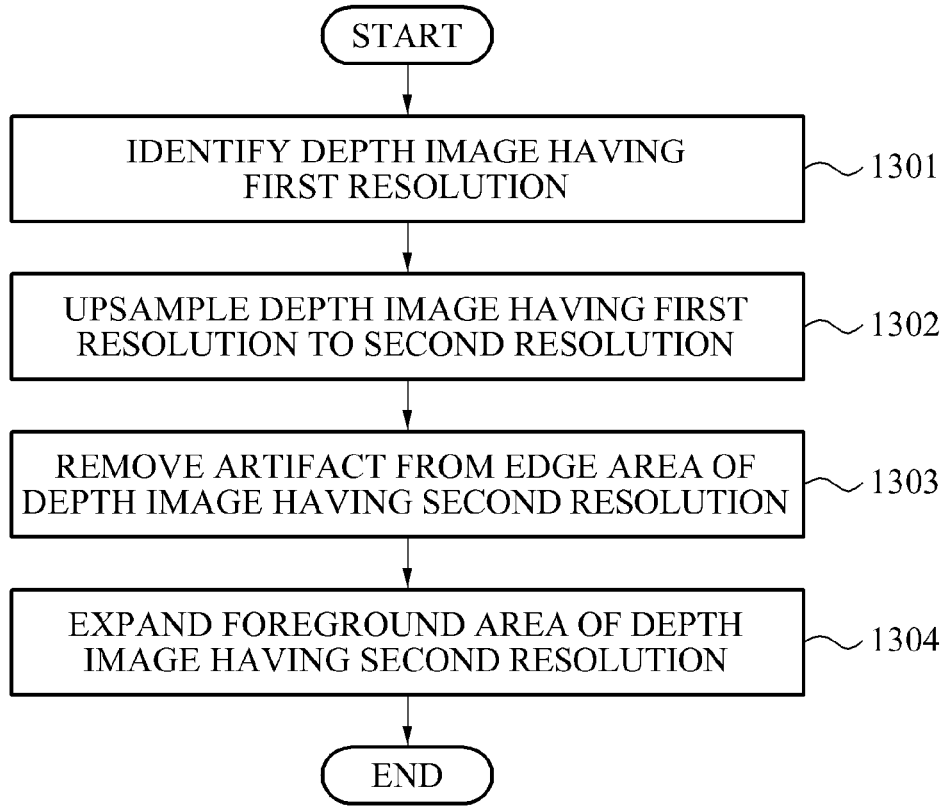
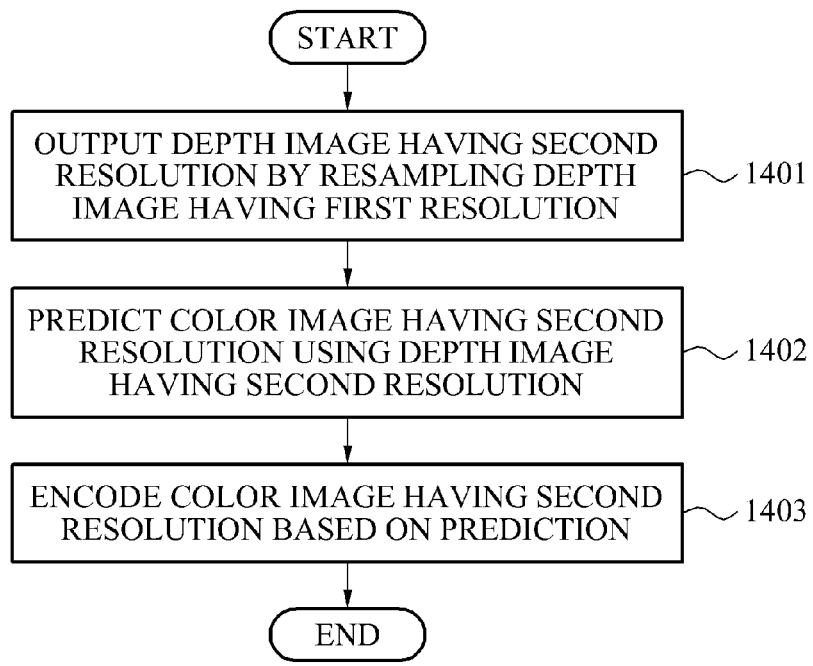

IMAGE PROCESSING METHOD AND APPARATUS FOR 3D VIDEO

CROSS-REFERENCE TO RELATED APPLICATIONS

This application claims the benefit under 35 U.S.C. §119 (e) of U.S. Provisional Application No. 61/590,895, filed on Jan. 26, 2012, in the U.S. Patent and Trademark Office, and under 35 U.S.C. §119(a) of Korean Patent Application Nos. 10-2012-0039313, filed on Apr. 16, 2012, 10-2012-0073992 filed on Jul. 6, 2012, 10-2012-0149850 filed on Dec. 20, 2012, and 10-2013-0007551 filed on Jan. 23, 2013 in the Korean Intellectual Property Office, the entire disclosures of which are hereby incorporated by reference.

BACKGROUND

1. Field

One or more example embodiments relate to an image processing method and apparatus for three-dimensional (3D) video, and more particularly, to a method for processing an inputted depth image having a resolution lower than a resolution of a corresponding color image.

2. Description of the Related Art

A three-dimensional (3D) video provides an image to a user with a sense of depth and a more realistic feeling than a two-dimensional (2D) video. A 3D video system provides a 3D video service using an image including a greater number of views than a stereoscopic 3D image. The 3D video system uses a data format including a plurality of color images and a plurality of depth images.

The depth image is used to generate a synthesized image of a virtual view. In this instance, an area other than a depth area in the depth image has simple and flat characteristics. Also, the depth image may be estimated or calculated from the color image, or may be obtained using a camera capable of outputting a depth image. In this instance, the depth image may have a resolution lower than a resolution of the color image.

Due to this characteristic of the depth image, the resolution of the depth image may be different from the resolution of the color image in the multiview-based video format. In this case, there is a need for a method of processing a difference in resolution between the depth image and the color image to encode or decode the color image.

SUMMARY

The foregoing and/or other aspects are achieved by providing an image processing method including identifying a first depth image, and upsampling the first depth image to a second depth image having expanded foreground area than the first depth image.

The upsampling of the first depth image to the second depth image may include upsampling the first depth image to the second depth image by applying a dilation filter.

The dilation filter may determines a pixel value of new pixel generated by upsampling, using a highest pixel value among a pixel value corresponding to neighbor pixels.

The upsampling of the first depth image to the second depth image may include upsampling the first depth image to the second depth image by applying a dilation filter having a size that is adjusted based on characteristic information of the first depth image.

The foregoing and/or other aspects are also achieved by providing an image processing method including identifying a first depth image, upsampling the first depth image to a second depth image, and expanding a foreground area of the second depth image.

The image processing method may further include removing an artifact from an edge area of the second depth image.

The upsampling of the first depth image to the second depth image may include upsampling the first depth image to the second depth image by interpolating the first depth image.

The expanding of the foreground area of the second depth image may include expanding the foreground area of the second depth image by applying a dilation filter to the second depth image.

The foregoing and/or other aspects are also achieved by providing an image processing method including outputting a second depth image by resampling a first depth image, predicting a color image using the second depth image, and encoding the color image based on the prediction.

The outputting of the second depth image by resampling the first depth image may include upsampling the first depth image to the second depth image having expanded foreground area than the first depth image.

The outputting of the second depth image by resampling the first depth image may include upsampling the first depth image to the second depth image, and expanding a foreground area of the second depth image.

The outputting of the second depth image by resampling the first depth image may include upsampling the first depth image to the second depth image, applying a filter to remove an artifact from an edge area of the second depth image, and expanding a foreground area of the filtered second depth image.

The image processing method may further include encoding a size of a dilation filter used in resampling the first depth image.

The foregoing and/or other aspects are also achieved by providing an image processing method including upsampling a first depth image to a second depth image through inloop resampling, in a three-dimensional (3D) video encoder, performing a view synthesis prediction of a color image using the upsampled second depth image, in the 3D video encoder, and encoding the color image based on the prediction, in the 3D video encoder.

The foregoing and/or other aspects are also achieved by providing an image processing method including outputting a second depth image by resampling a first depth image extracted from a bit stream, predicting a color image extracted from the bit stream, using the second depth image, and decoding the color image based on the prediction.

The outputting of the second depth image by resampling the first depth image may include upsampling the first depth image to the second depth image having expanded foreground area than the first depth image.

The outputting of the second depth image by resampling the first depth image may include upsampling the first depth image to the second depth image, and expanding a foreground area of the second depth image.

The outputting of the second depth image by resampling the first depth image may include upsampling the first depth image to the second depth image, applying a filter to remove an artifact from an edge area of the second depth image, and expanding a foreground area of the filtered second depth image.

The outputting of the second depth image by resampling the first depth image may include resampling the first depth image based on a size of a dilation filter included in the bit stream.

The foregoing and/or other aspects are also achieved by providing an image processing method including upsampling a first depth image included in a bit stream to a second depth image through inloop resampling, in a 3D video decoder, performing a view synthesis prediction of a color image included in the bit stream using the upsampled second depth image, in the 3D video decoder, and decoding the color image based on the prediction, in the 3D video decoder.

The foregoing and/or other aspects are also achieved by providing an image processing method including identifying a decoded depth image, and resampling the depth image to a resolution of a color image, through post-processing, when a resolution of the depth image is different from the resolution of the color image.

The foregoing and/or other aspects are also achieved by providing an image processing method including determining whether a resolution of a depth image is equal to a resolution of a color image, and downsampling the depth image through pre-processing when the resolution of the depth image is equal to the resolution of the color image.

The foregoing and/or other aspects are also achieved by providing an image processing apparatus including an image identifying unit to identify a first depth image, and an upsampling unit to upsample the first depth image to a second depth image having expanded foreground area than the first depth image.

The foregoing and/or other aspects are also achieved by providing an image processing apparatus including an image identifying unit to identify a first depth image, an upsampling unit to upsample the first depth image to a second depth image, and an area expanding unit to expand a foreground area of the upsampled second depth image using a dilation filter.

The foregoing and/or other aspects are also achieved by providing an image processing apparatus including a resampling unit to output an upsampled second depth image by resampling a downsampled first depth image, a predicting unit to predict a color image using the second depth image, and an image encoding unit to encode the color image based on the prediction.

The foregoing and/or other aspects are also achieved by providing an image processing apparatus including a resampling unit to output an upsampled second depth image by resampling a downsampled first depth image included in a bit stream, a predicting unit to predict a color image included in the bit stream using the second depth image, and an image encoding unit to decode the color image based on the prediction.

The foregoing and/or other aspects are also achieved by providing method of adjusting a depth image. The method includes determining a depth image having a lower resolution than a corresponding color image, upsampling the depth image for increasing the resolution of the depth image when the depth image is determined as having a lower resolution than the corresponding color image; and expanding a foreground area of the upsampled depth image by applying a dilation filter to the upsampled depth image, wherein a size of the dilation filter is determined based on a resolution of a depth image.

The foregoing and/or other aspects are also achieved by providing 3-dimensional display including an apparatus for generating multi-views. The 3-dimensional display includes a processor to control one or more processor-executable units, an image identifying unit to determine a depth image having a lower resolution than a corresponding color image; and an upsampling unit to upsample the depth image for increasing the resolution of the depth image when the depth image is determined as having a lower resolution than the corresponding color image, and to expand a foreground area of the upsampled depth image by applying a dilation filter to the upsampled depth image, wherein a size of the dilation filter is determined based on a resolution of a depth image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 13 illustrates an image processing method according to another example embodiment;

FIG. 14 illustrates an image processing method according to still another example embodiment;

DETAILED DESCRIPTION

Figure 1:
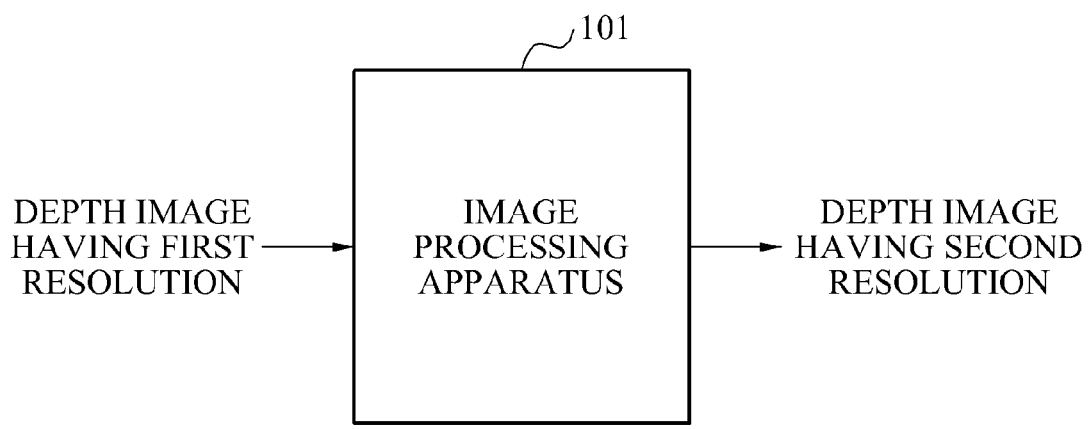
FIG. 1 illustrates operation of an image processing apparatus according to example embodiments.

Reference will now be made in detail to embodiments, examples of which are illustrated in the accompanying drawings, wherein like reference numerals refer to like elements throughout. Embodiments are described below to explain the present disclosure by referring to the figures.

According to one or more example embodiments, a depth image may have a resolution less than or equal to a resolution of a corresponding color image. For example, a particular region of a depth image may have a resolution less than or equal to a resolution of a color image of the same particular region, that is, of a corresponding color region. As another example, a particular pixel of a depth image may have a resolution less than or equal to a resolution of a color image of the same particular pixel, that is, of a corresponding color pixel. Accordingly, when a resolution of a depth image is lower than a resolution of a corresponding color image in a three-dimensional (3D) video format including a multiview color video and a multiview depth video, one or more example embodiments suggest upsampling the depth image so that the depth image may have a resolution equal to the resolution of the color image. In this case, when the depth image is a result obtained through decoding, a dilation filter may be applied through pre-processing.

Dilation filtering, also known as a maximum filtering, generally functions by considering neighboring pixels around or surrounding a particular pixel. Here, using a pixel in a depth image, a maximum value may be determined from among each of the pixels neighboring the pixel of the depth image. Then, each pixel in the depth image may be replaced by the determined maximum value generated for its respective neighborhood. The dilation filtering may be performed as a part of the upsampling or may be performed separately from upsampling. The upsampling may be applied through linear interpolation. Also, the dilation filter may be applied to the upsampled depth image. In this instance, the dilation filtering may be performed by selecting a maximum value among pixel values of adjacent pixels. For example, in an embodiment, the dilation filtering may replace a value of one or more predetermined pixels with the maximum value of any one of the surrounding adjacent pixels. Here, one or more predetermined pixels are generated by upsampling based on interpolation.

Synthesis artifacts may occur along the boundary between a foreground area and a background area. In this instance, when the dilation filter is applied, the foreground area of the upsampled depth image may be expanded to the background area, so that any synthesis artifacts that do occur may occur outside of the boundary. Accordingly, when view synthesis is performed on a dilation filtered-depth image, a view synthesis result may have improved quality. A size of the dilation filter may be determined based on a resolution of an inputted depth image of an encoder and a decoder, and a need to transmit additional information from the encoder to the decoder may be eliminated.

In an embodiment, when a resolution of a depth image is equal to a resolution of a color image, upsampling may be unnecessary. But, pre-processing for downsampling is needed to decrease a resolution of a depth image less than a resolution of a color image.

FIG. 1 illustrates operation of an image processing apparatus according to the example embodiments.

Referring to FIG. 1, the image processing apparatus 101 may output a second depth image by upsampling a first depth image. In the example embodiments, a resolution of the first depth image may be lower than a resolution of the second depth image. For example, the resolution of the first depth image may correspond to ½, ¼, ⅛, or 1/16 of the resolution of the second depth image. In this instance, the first depth image may have a lower resolution than a corresponding color image. The image processing apparatus 101 may apply various filters to upsample the first depth image. The second depth image obtained by upsampling the first depth image may have the same or similar resolution as the corresponding color image.

In alternative embodiments, the resolution of the first depth image may be equal to the resolution of the second depth image. In this case, upsampling of the first depth image may be unnecessary.

Hereinafter, the operation of the image processing apparatus 101 is described in further detail.

Figure 2:
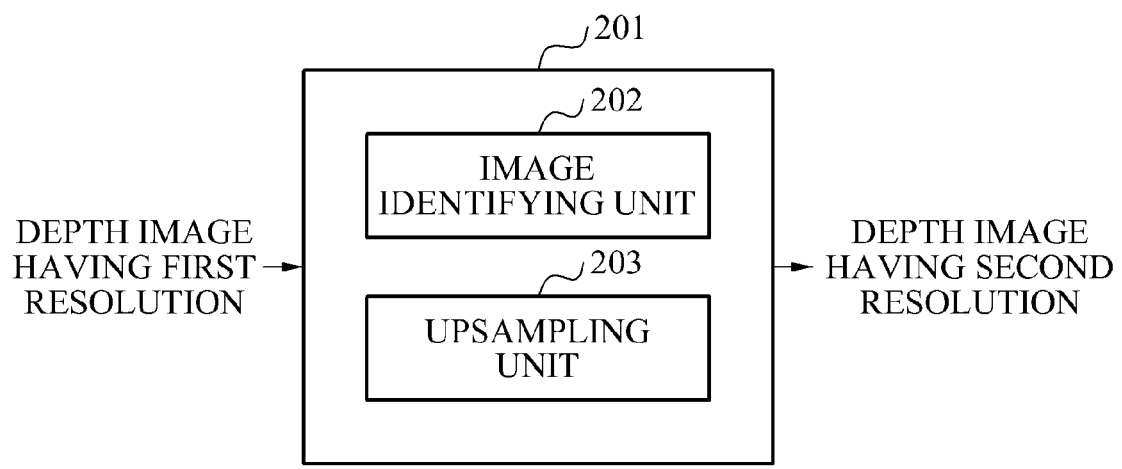
FIG. 2 illustrates an image processing apparatus according to an example embodiment.

FIG. 2 illustrates an image processing apparatus 201 according to an example embodiment.

Referring to FIG. 2, the image processing apparatus 201 may include, for example, an image identifying unit 202 and an upsampling unit 203. In FIG. 2, a first depth image may have a lower resolution than a second depth image. To generate a synthesized image of a virtual view, the second depth image may be synthesized with a corresponding color image having the same or similar resolution.

The image identifying unit 202 may identify a first depth image. That is, the image processing apparatus 201 may receive the first depth image and the image identifying unit 202 may identify the first depth image having a lower resolution than the corresponding color image. In this instance, the identified first depth image may have been estimated or calculated from a color image, or obtained from a separate depth video camera.

The upsampling unit 203 may increase a resolution of the first depth image by generating new pixel in the first depth image. The first depth image may be converted into a second depth image through the upsampling unit 203.

For example, the upsampling unit 203 may upsample the first depth image to the second depth image which has larger resolution than first depth image. The dilation filter may be used to upsample the first depth image. In this instance, the dilation filter may perform a filtering operation with respect to new pixel using a pixel value that is highest among a pixel value corresponding to neighbor pixels around the new pixel. The new pixel is generated by upsampling of the first depth image. The operation of the dilation filter is described in further detail with reference to FIG. 7 and the operation of the dilation filter when performed concurrently with upsampling according to example embodiments is described in further detail with reference to FIG. 9.

That is, in FIG. 2, a method of upsampling the depth image to improve the resolution of the depth image is suggested. When the foreground area of the depth image is expanded using the dilation filter, synthesis artifacts that may occur in the foreground area of the depth image having improved resolution may be prevented or minimized.

In contrast with FIG. 2, the dilation filter may be applied to a downsampled first depth image. Through this process, the first depth image may be outputted as a second depth image having improved resolution and expanded foreground area than the first depth image.

Figure 3:
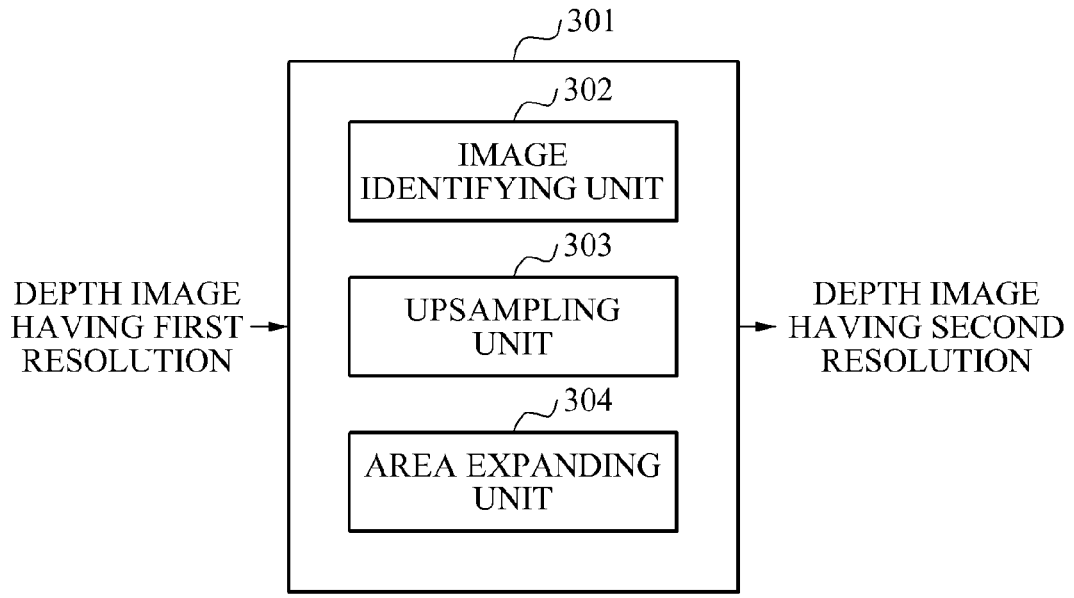
FIG. 3 illustrates an image processing apparatus according to another example embodiment.

FIG. 3 illustrates an image processing apparatus 301 according to another example embodiment.

Referring to FIG. 3, the image processing apparatus 301 may include, for example, an image identifying unit 302, an upsampling unit 303, and an area expanding unit 304. In FIG. 3, a first depth image may have a lower resolution than a second depth image. To generate a synthesized image of a virtual view, the second depth image may be synthesized with a corresponding color image having the same or similar resolution.

The image identifying unit 302 may identify a first depth image. In this instance, the identified depth image may be estimated or calculated from a color image, or obtained from a separate depth video camera.

The upsampling unit 303 may upsample the first depth image to a second depth image. For example, the upsampling unit 303 may upsample the first depth image to the second depth image based on an interpolation method. For example, the upsampling unit 303 may upsample the first depth image to the second depth image based on a linear interpolation method, a Lanczos interpolation method, a cubic interpolation method, and the like. That is, the upsampling unit 303 may upsample the first depth image to the second depth image by increasing the number of pixels through an interpolation method. In the example embodiments, the interpolation method is not limited to the foregoing interpolation methods and may include any interpolation method that may improve the resolution.

The area expanding unit 304 may expand a foreground area of the upsampled second depth image. For example, the area expanding unit 304 may expand the foreground area of the second depth image by applying the dilation filter to the upsampled second depth image.

That is, the image processing apparatus 301 of FIG. 3 suggests a two-step process of resolution increase and subsequent area expansion, whereas in contrast the image processing apparatus 201 of FIG. 2 suggests a one-step process of resolution increase and area expansion.

Figure 4:
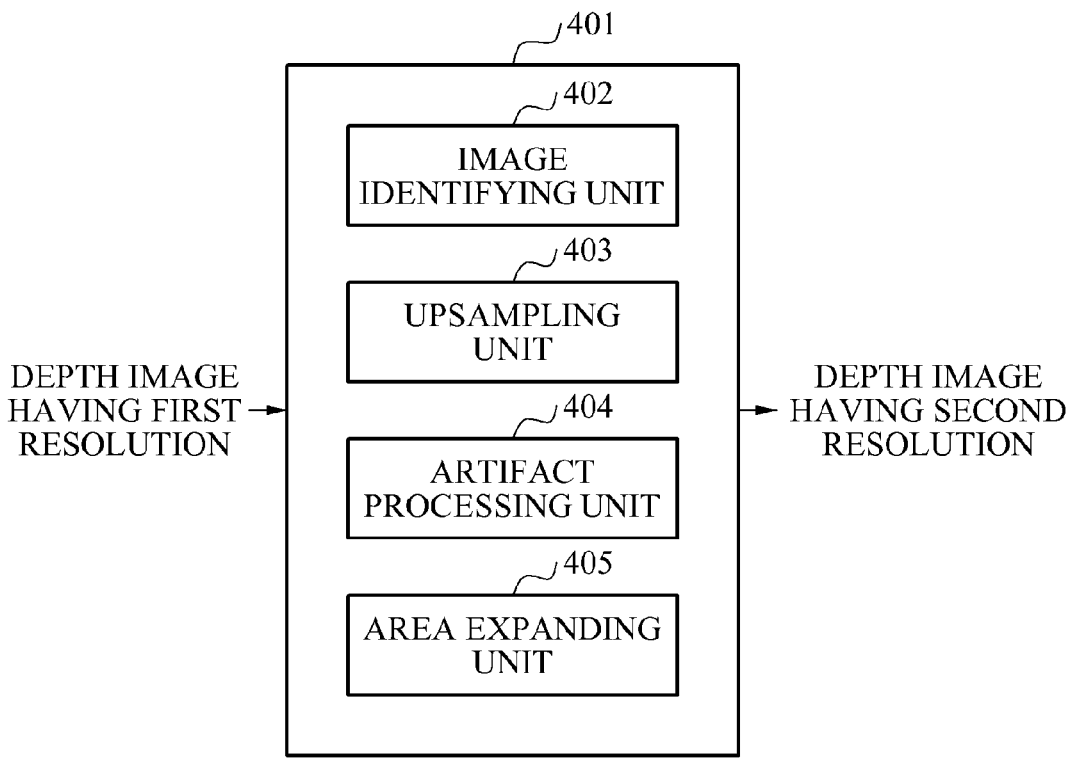
FIG. 4 illustrates an image processing apparatus according to still another example embodiment.

FIG. 4 illustrates an image processing apparatus 401 according to still another example embodiment.

Referring to FIG. 4, the image processing apparatus 401 may include, for example, an image identifying unit 402, an upsampling unit 403, an artifact processing unit 404, and an area expanding unit 405. In FIG. 4, a first depth image may have a lower resolution than a second depth image. To generate a synthesized image of a virtual view, the second depth image may be synthesized with a color image having the same or similar resolution.

The image identifying unit 402 may identify a first depth image. In this instance, the identified depth image may be estimated or calculated from a color image, or obtained from a separate depth video camera.

The upsampling unit 403 may upsample the first depth image to a second depth image. For example, the upsampling unit 403 may upsample the first depth image to the second depth image based on an interpolation method. For example, the upsampling unit 403 may upsample the first depth image to the second depth image based on a linear interpolation method, a Lanczos interpolation method, a cubic interpolation method, and the like.

The artifact processing unit 404 may remove an artifact from an edge area of the second depth image. Here, an artifact may be present in the second depth image having the improved resolution through upsampling, for example, ringing, in the edge area. In particular, the depth image may be used in generating a synthesized image of a virtual view by synthesizing the depth image with a corresponding color image having the same or similar resolution. In this instance, an artifact may be present in the edge area of the generated synthesized image, in which an occlusion area or a de-occlusion area may exist.

In particular, a foreground area having a relatively shallow depth in the synthesized image may generally correspond to an object. Since the foreground object may have more complex texture information than a background area, there is a high possibility that an artifact may occur in an area in which the object is located. Accordingly, the artifact processing unit 404 may remove an artifact from the second depth image by applying a deringing filter, for example, a bilateral filter, a median filter, and the like.

The area expanding unit 405 may expand the foreground area of the artifact-free second depth image. For example, the area expanding unit 405 may expand the foreground area of the second depth image by applying the dilation filter to the upsampled second depth image. An order in which operations are performed by the artifact processing unit 404 and the area expanding unit 405 in the image processing apparatus 401 of FIG. 4 may vary.

Figure 5:
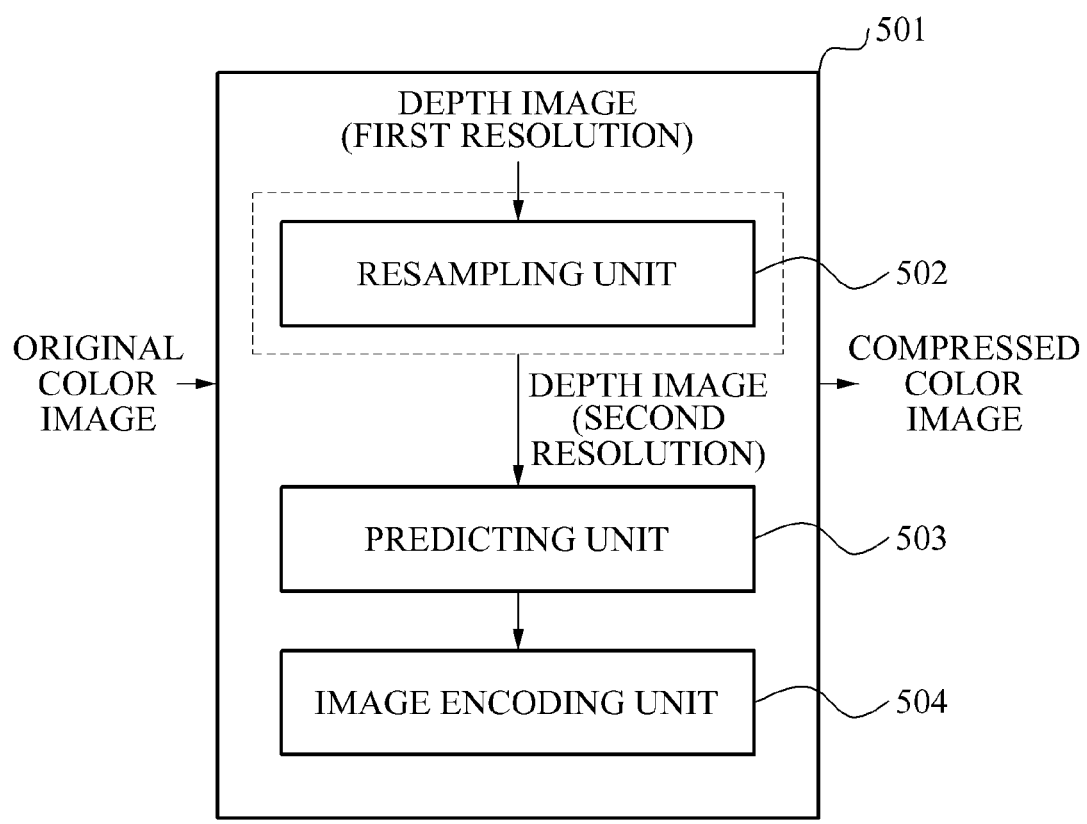
FIG. 5 illustrates an image processing apparatus according to yet another example embodiment.

FIG. 5 illustrates an image processing apparatus 501 according to yet another example embodiment.

The image processing apparatus 501 of FIG. 5 may correspond to an encoder to encode a depth image and a color image. Referring to FIG. 5, the image processing apparatus 501 may include, for example, a resampling unit 502, a predicting unit 503, and an image encoding unit 504. In FIG. 5, a first depth image may have a lower resolution than a second depth image. To generate a synthesized image of a virtual view, the second depth image may be synthesized with a color image having the same or similar resolution.

The resampling unit 502 may output a second depth image by resampling a first depth image. Here, when encoding the depth image, the resampling unit 502 may perform an in-loop operation in the image processing apparatus 501 corresponding to an encoder.

For example, the resampling unit 502 may operate in a similar manner as one of the image processing apparatuses of FIGS. 2 through 4. As described with reference to FIG. 2, the resampling unit 502 may output the second depth image having expanded foreground area than the first depth image through upsampling the first depth image using a dilation filter.

As described with reference to FIG. 3, the resampling unit 502 may output the second depth image by upsampling the first depth image based on an interpolation method to increase the resolution of the first depth image. Next, the resampling unit 502 may expand a foreground area of the upsampled second depth image by applying a dilation filter to the second depth image.

As described with reference to FIG. 4, the resampling unit 502 may output the second depth image by upsampling the first depth image based on an interpolation method to increase the resolution of the first depth image. Next, the resampling unit 502 may remove an artifact included in the second depth image. Finally, the resampling unit 502 may expand a foreground area of the second depth image by applying a dilation filter to the artifact-free second depth image.

The predicting unit 503 may predict a color image using the second depth image. For example, the predicting unit 503 may predict the color image by a view synthesis prediction method. In this instance, the predicting unit 503 may use a depth image, in which a view is changed, to predict the color image.

The image encoding unit 504 may encode the color image based on the prediction. That is, the image encoding unit 504 may generate a bit stream by encoding a prediction mode applied to view synthesis prediction and residual data of the color image derived as a result of the prediction.

Although not shown, when the resolution of the first depth image is equal to the resolution of the corresponding color image, the resolution of the first depth image may be downsampled through pre-processing. That is, the resolution of the first depth image may be reduced through downsampling to have a resolution lower than the resolution of the corresponding color image. In an embodiment, reducing the resolution of the depth image may be desirable to reduce a processing or data throughput requirement. The downsampled first depth image may be inputted in the image processing apparatus 501 corresponding to an encoder. When the first depth image is downsampled, distortion may occur in an edge area of the first depth image due to downsampling. To prevent or minimize distortion, the image processing apparatus 501 may execute a process of linear interpolation, or may perform a low-pass filtering operation using a filter, for example, a Gaussian filter, and then execute linear interpolation.

Figure 6:
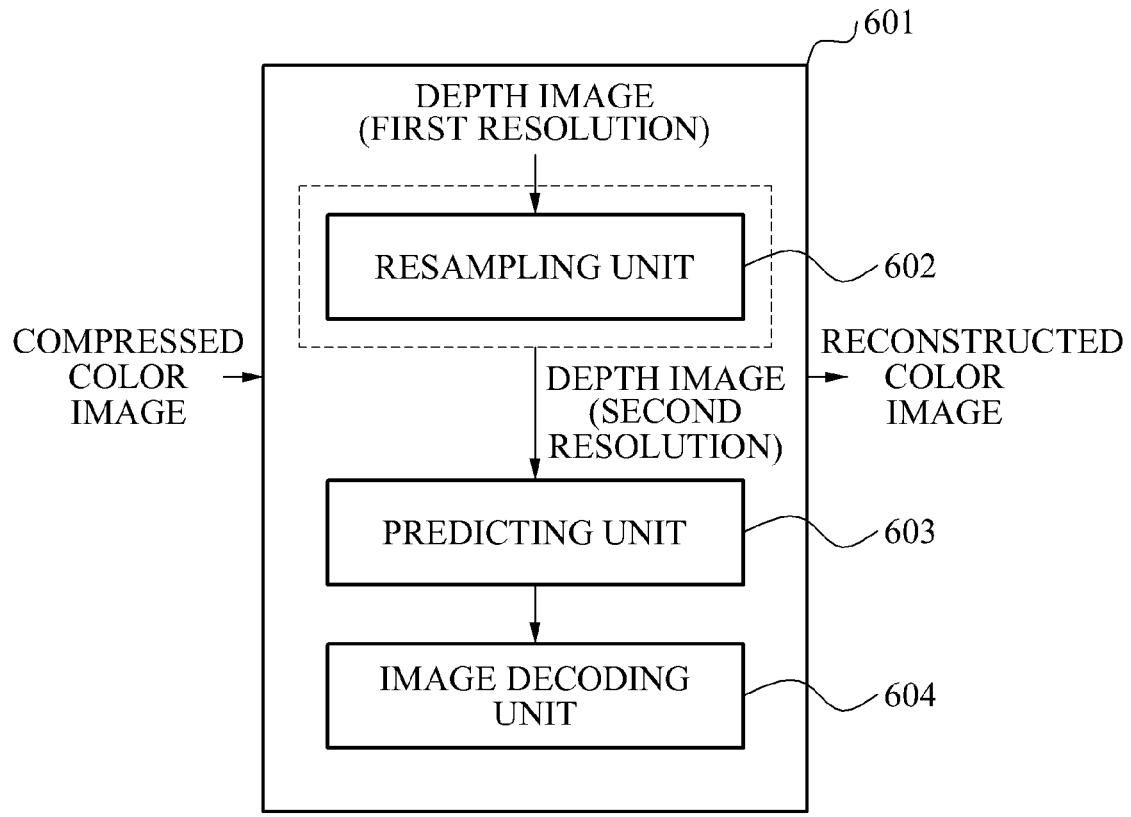
FIG. 6 illustrates an image processing apparatus according to further another example embodiment.

FIG. 6 illustrates an image processing apparatus 601 according to still another example embodiment.

The image processing apparatus 601 of FIG. 6 may correspond to a decoder to decode a depth image and a color image. Referring to FIG. 6, the image processing apparatus 601 may include, for example, a resampling unit 602, a predicting unit 603, and an image decoding unit 604. In FIG. 6, a first depth image may have a lower resolution than a second depth image. To generate a synthesized image of a virtual view, the second depth image may be synthesized with a color image having the same or similar resolution.

The resampling unit 602 may output a second depth image by resampling a first depth image. Here, when the depth image is being encoded, the resampling unit 602 may perform an in-loop operation in the image processing apparatus 601 corresponding to a decoder. In this instance, the first depth image may correspond to a downsampled depth image and the second depth image may correspond to a depth image obtained by upsampling the first depth image. Also, the first depth image may be encoded by an encoder and may be inputted in the image processing apparatus 101 in bitstream form.

As an example, the resampling unit 602 may operate in a similar manner to one of the image processing apparatuses of FIGS. 2 through 4. As described with reference to FIG. 2, the resampling unit 602 may output the second depth image by upsampling the first depth image using a dilation filter.

As described with reference to FIG. 3, the resampling unit 602 may output the second depth image by upsampling the first depth image based on an interpolation method to increase the resolution of the first depth image. Subsequently, the resampling unit 602 may expand a foreground area of the second depth image by applying a dilation filter to the upsampled second depth image.

As described with reference to FIG. 4, the resampling unit 602 may output the second depth image by upsampling the first depth image based on an interpolation method to increase the resolution of the first depth image. Next, the resampling unit 602 may remove an artifact included in the second depth image. Finally, the resampling unit 602 may expand a foreground area of the second depth image by applying a dilation filter to the artifact-free second depth image.

The predicting unit 603 may predict a color image using the second depth image. Here, the color image may be encoded by an encoder and may be included in a bit stream. For example, the predicting unit 603 may predict the color image by a view synthesis prediction method. In this instance, the predicting unit 603 may use a depth image in which a view is changed to predict the color image. In this instance, the view synthesis prediction method may be transmitted in the form of flag by the encoder, or may be newly determined by the image processing apparatus 601 corresponding to a decoder.

The image decoding unit 604 may decode the color image based on prediction.

Although not shown, the depth image may be upsampled through post-processing. For example, when the resolution of the inputted depth image is different from the resolution of the color image, the image processing apparatus 601 may output the second depth image by upsampling the decoded first depth image after decoding. Here, a process of upsampling the depth image is described above with reference to FIGS. 2 through 4.

Figure 7:
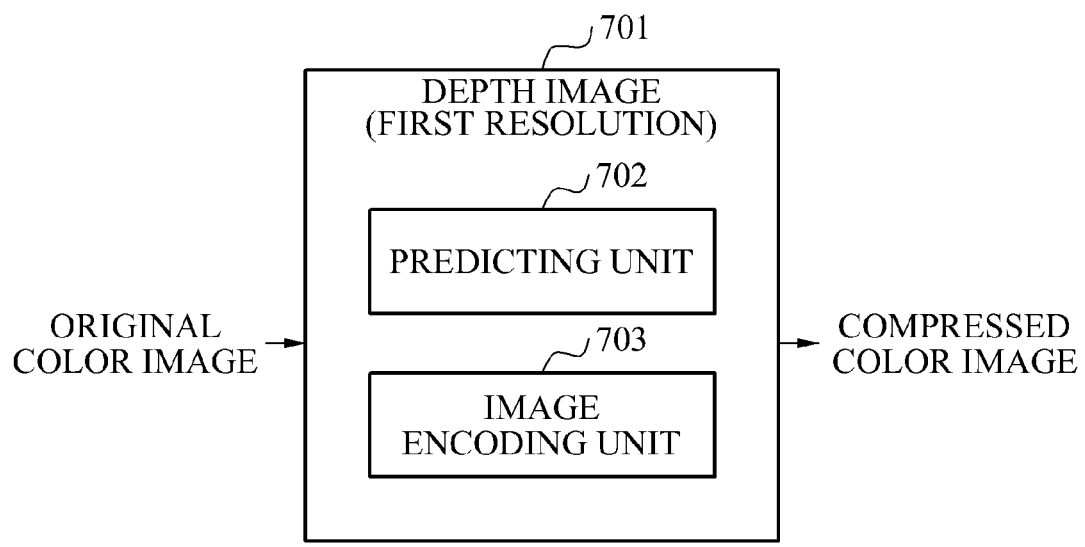
FIG. 7 illustrates an image processing apparatus according to another example embodiment.

FIG. 7 illustrates an image processing apparatus 701 according to another example embodiment.

Referring to FIG. 7, the image processing apparatus 701 may include, for example, a predicting unit 702 and an image encoding unit 703. In FIG. 7, a depth image may have a lower resolution than a color image.

The predicting unit 702 may predict a color image by a view synthesis prediction method. In this instance, the predicting unit 702 may replace resampling of a depth image with warping for view synthesis prediction. When referring to pixels of the depth image during warping, the predicting unit 702 may select a maximum pixel value among pixel values of depth images of adjacent views through a dilation filter.

The depth image may correspond to a downsampled depth image, and may be inputted in the predicting unit 702 in an encoded form. The depth image may be encoded before encoding the color image.

Here, warping may refer to projecting a color image of a predetermined view to another view using a depth image and a camera parameter. Warping may be based on inverse projection of a color image or a reference image to a 3D space, followed by projection to a virtual view. When a depth image is used in warping, a maximum pixel value may be selected among pixel values of depth images of adjacent views through a dilation filter.

The image encoding unit 703 may encode the color image based on the view synthesis prediction. The image encoding unit 703 may generate a synthesized image of the same virtual view as a current view using color images of views adjacent to the color image to be encoded. The image encoding unit 703 may encode a color image of the current view through the synthesized image. The image encoding unit 703 may determine whether to encode a predicted block of the synthesized image or to encode a predicted block and a residual signal or a difference between a current block and the predicted block, based on an encoding mode.

Figure 8:
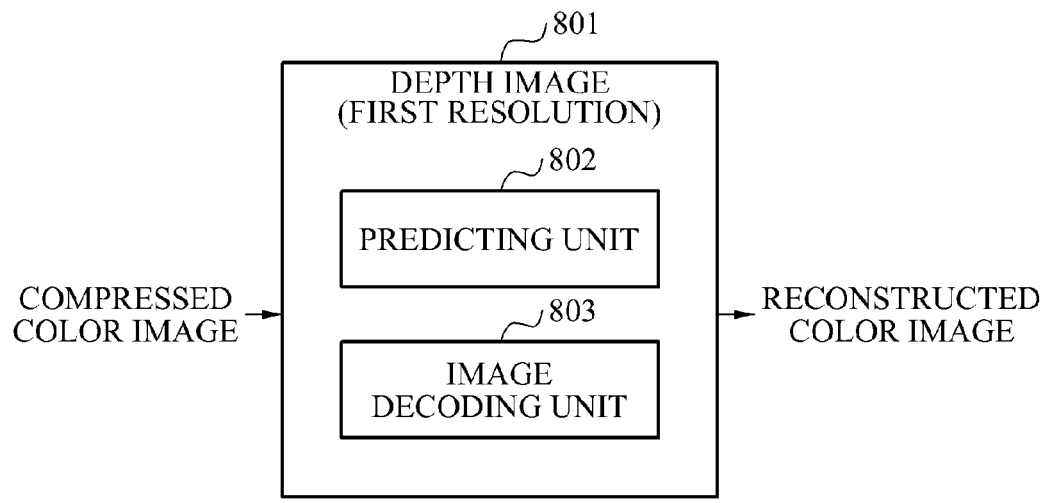
FIG. 8 illustrates an image processing apparatus according to still another example embodiment.

FIG. 8 illustrates an image processing apparatus 801 according to still another example embodiment.

Referring to FIG. 8, the image processing apparatus 801 may include, for example, a predicting unit 802 and an image decoding unit 803. In FIG. 8, a depth image may have a lower resolution than a color image.

The predicting unit 802 may predict a color image by a view synthesis prediction method. In this instance, the predicting unit 802 may replace resampling of a depth image with warping for view synthesis prediction. When referring to pixels of the depth image during warping, the predicting unit 802 may select a maximum pixel value among pixel values of depth images of adjacent views through a dilation filter.

The depth image may correspond to a downsampled depth image, and may be inputted in the predicting unit 802 in a decoded form. The depth image may be decoded before decoding the color image.

The image decoding unit 803 may decode the color image based on the view synthesis prediction. The decoding of the color image may be substantially identical to the disclosure of FIG. 7.

When the first depth image and the second depth image have the same resolution in FIGS. 1 through 4, upsampling of the first depth image may be unnecessary. For example, when the first depth image and the second depth image have the same resolution in FIGS. 1 through 4, a dilation filter may be applied to the first depth image directly absent upsampling so that the foreground area of the first depth image may be expanded.

Also, when the depth image and the color image have the same resolution in FIGS. 5 through 8, upsampling of the depth image may be unnecessary. For example, when the depth image and the color image have the same resolution in FIGS. 5 through 8, a dilation filter may be applied to the depth image directly absent upsampling so that the foreground area of the depth image may be expanded.

Figure 9:
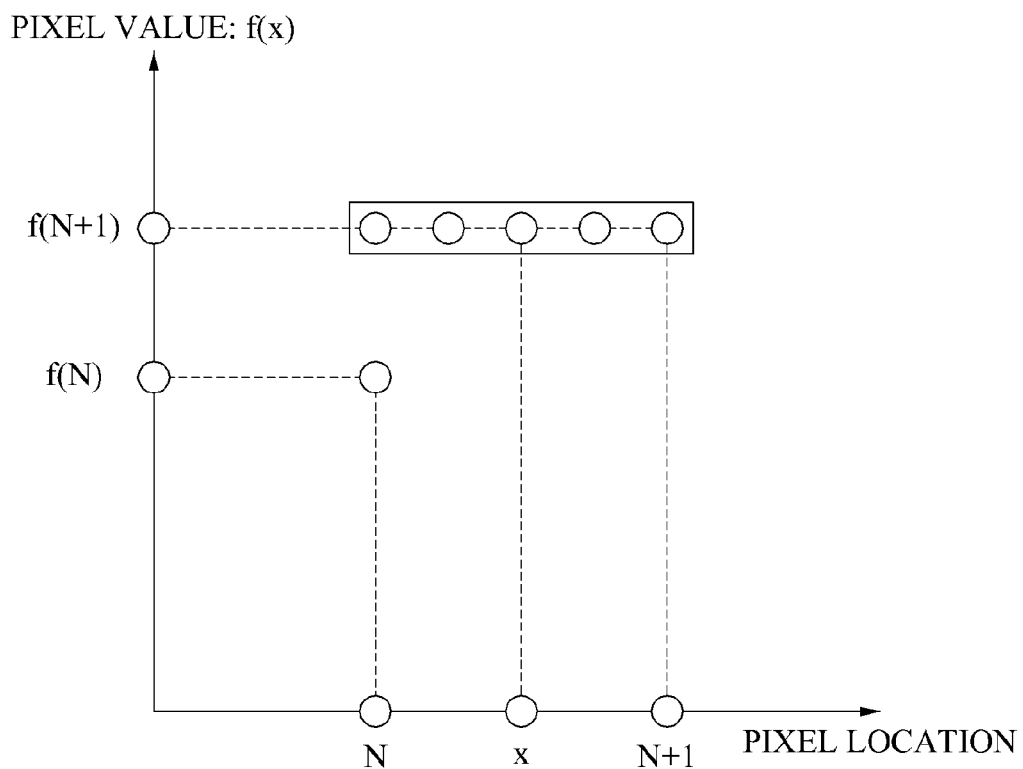
FIG. 9 illustrates operation of a dilation filter according to example embodiments.

FIG. 9 illustrates operation of the dilation filter according to example embodiments.

Referring to FIG. 9, pixel x denote new pixel generated by upsampling. A pixel value f(N) corresponding to a neighbor pixel N and a pixel value f(N+1) corresponding to a neighbor pixel N+1 with respect to new pixel x are given. The dilation filter may operate in accordance with the following Equation 1:

$$f(x)=\max\{f(N),f(N+1)\}(N \leq x < N+1)$$ [Equation 1]

According to Equation 1, pixel value of new pixel x located between the neighbor pixel N and the neighbor pixel N+1 may be determined with a pixel value that is higher from among the pixel value of the neighbor pixel N and the pixel value of the neighbor pixel N+1 by the dilation filter. That is, the dilation filter may determine a pixel value of a pixel x that is to be created between a first location and a second location to be a higher pixel value from among a pixel value corresponding to the first location and a pixel value corresponding to the second location. For example, the neighbor pixel N and the neighbor pixel N+1 may be included in a depth image of the same view or may be each included in depth images of different views.

Referring to FIG. 9, the pixel value f(N+1) corresponding to the neighbor pixel N+1 may be higher than the pixel value f(N) corresponding to the neighbor pixel N. The pixel value f(x) of new pixel x may therefore be determined with the pixel value f(N+1) of the neighbor pixel N+1 by the dilation filter.

FIG. 9 illustrates operation of a dilation filter when performed concurrently with upsampling according to example embodiments. When the dilation filter is applied during upsampling as described with reference to FIG. 2, a new pixel x may be created between the neighbor pixel N and the neighbor pixel N+1. For example, the pixel value of new pixel x may be determined by selecting the larger value from among the pixel value f(N+1) of neighbor pixel, and the pixel value f(N) of neighbor pixel N, using the dilation filter. Thus, when the pixel value f(N+1) is higher than the pixel value f(N) the pixel value x may be replaced with the pixel value f(N+1) by the dilation filter.

Also, when the dilation filter is applied after upsampling is performed, as described with reference to FIGS. 3 and 4, the pixel value of the new pixel is assigned to calculated pixel value based on pixel value neighbor pixel. For example, through upsampling, the pixel value of the new pixel is determined average value or a half value with respect to pixel value of neighbor pixels. And, when the dilation filter is applied to the upsampled depth image, the pixel value of the new pixel is changed to highest pixel valued among pixel value of neighbor pixels FIG. 10 illustrates a process of performing a view synthesis prediction according to example embodiments.

Figure 10:
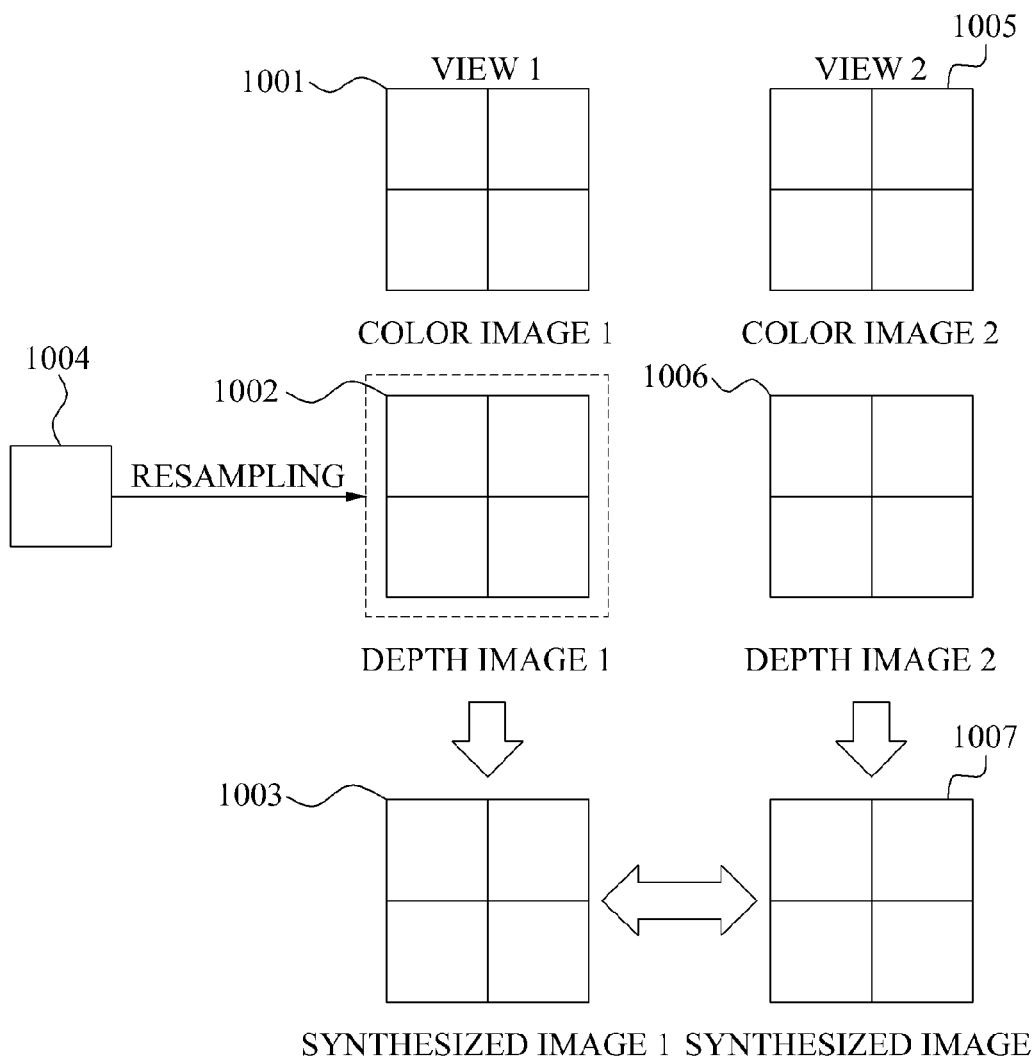
FIG. 10 illustrates a process of performing a view synthesis prediction according to example embodiments.

Referring to FIG. 10, when a first color image 1001 and a first depth image 1002 correspond to a first view, the first depth image 1002 may correspond to an image having an improved resolution by resampling a first depth image 1004.

When view synthesis prediction is applied to a second color image 1005 corresponding to a second view, a difference between a synthesized image 1003 of the first view obtained from the first color image 1001 and the first depth image 1002 and a synthesized image 1007 of a second view obtained from the second color image 1005 and a second depth image 1006, that is, residual data may be derived. The derived residual data may be encoded. That is, when view synthesis prediction is applied to the second color image 1005, the first depth image 1002 having the same resolution as the second color image 1005 may be used. When the resolution of the first depth image 1004 is lower than the resolution of the second color image 805 before encoding or decoding, the resolution of the first depth image 1004 may need to be improved.

Figure 11:
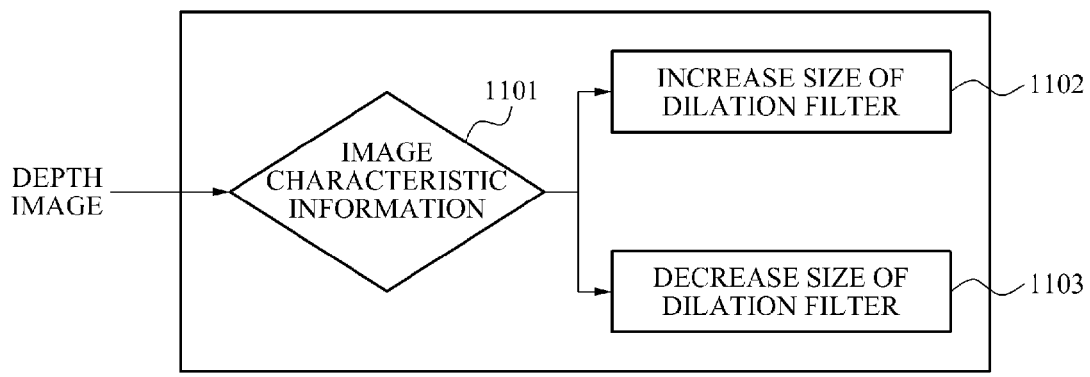
FIG. 11 illustrates a process of varying a filter size based on image characteristic information of a depth image according to example embodiments.

FIG. 11 illustrates a process of varying a filter size based on image characteristic information of a depth image according to example embodiments.

Referring to FIG. 11, the image processing apparatus may determine image characteristic information of a depth image in operation 1101. Next, the image processing apparatus may increase or decrease a size of a dilation filter based on the image characteristic information of the depth image, in operation 1102 or in operation 1103. Unlike FIG. 11, the size of the dilation filter may be inputted separately as, for example, an input parameter.

Here, the image characteristic information may correspond to information indicating how the depth image is generated. For example, the image characteristic information may correspond to information indicating whether the depth image is estimated or calculated from a color image or derived from a depth video camera. That is, the image characteristic information may be associated with an origin or accuracy of the depth image. According to the example embodiments, the size of the dilation filter may be variably adjusted depending on the image characteristic information.

For example, when the accuracy of the depth image is relatively high, for example, when the depth image is derived from a depth video camera, the image processing apparatus may increase the size of the dilation filter. In contrast, when the accuracy of the depth image is relatively low, for example, when the depth image is estimated or calculated from a color image, the image processing apparatus may decrease the size of the dilation filter.

The aspect described in the current embodiment in which the size of the dilation filter may vary based on the image characteristic information indicating an accuracy or origin of the depth image may also be applied to FIGS. 2 through 6.

Figure 12:
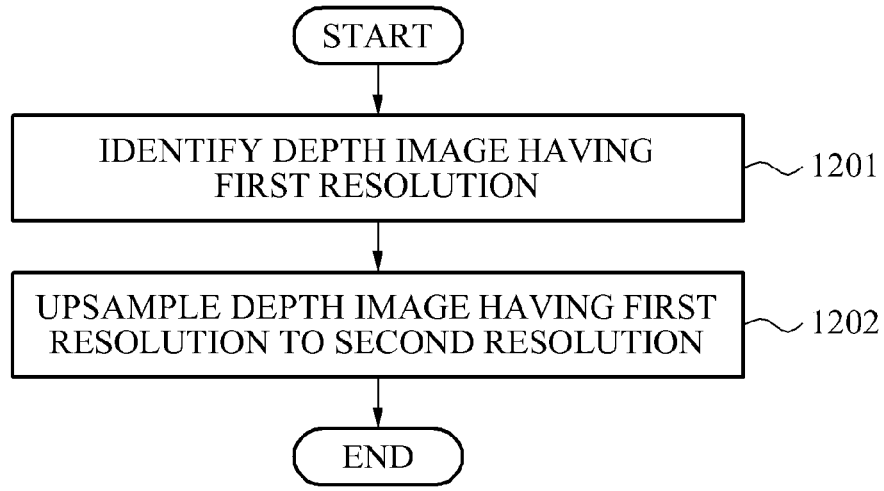
FIG. 12 illustrates an image processing method according to an example embodiment.

FIG. 12 illustrates an image processing method according to an example embodiment.

In FIG. 12, a first depth image may have a lower resolution than a second depth image. To generate a synthesized image of a virtual view, the second depth image may be synthesized with a color image having the same or similar resolution.

Referring to FIG. 12, in operation 1201, the image processing apparatus identifies a first depth image.

In operation 1202, the image processing apparatus upsamples the first depth image to a second depth image having expanded foreground area than the first depth image. For example, the image processing apparatus may upsample the first depth image to the second depth image. In this instance, the image processing apparatus may perform a filtering operation using a pixel value of new pixel selected from among a pixel corresponding to a first location and a pixel corresponding to a second location, whichever is higher. The new pixel is created from the operation of upsampling.

According to the method of FIG. 12, when the foreground area of the depth image is expanded using the dilation filter, synthesis artifacts that may occur in the foreground area of the depth image having improved resolution may be prevented.

Also, the image processing apparatus may upsample the first depth image to the second depth image by applying the dilation filter having a size that is adjusted based on image characteristic information of the first depth image as described in greater detail above with respect to FIG. 9.

FIG. 13 illustrates an image processing method according to another example embodiment.

In FIG. 13, a first depth image may have a lower resolution than a second depth image. To generate a synthesized image of a virtual view, the second depth image may be synthesized with a color image having the same or similar resolution.

Referring to FIG. 13, in operation 1301, the image processing apparatus identifies a first depth image.

In operation 1302, the image processing apparatus upsamples the first depth image to a second depth image. For example, the image processing apparatus may upsample the first depth image to the second depth image by interpolating the first depth image.

In operation 1303, the image processing apparatus removes an artifact from an edge area of the second depth image.

In operation 1304, the image processing apparatus expands a foreground area of the second depth image. For example, the image processing apparatus may expand the foreground area of the second depth image by applying a dilation filter to the second depth image.

FIG. 14 illustrates an image processing method according to still another example embodiment.

In FIG. 14, a first depth image may have a lower resolution than a second depth image. To generate a synthesized image of a virtual view, the second depth image may be synthesized with a color image having the same or similar resolution.

Referring to FIG. 14, in operation 1401, the image processing apparatus outputs a second depth image by resampling a first depth image.

According to an embodiment, the image processing apparatus may upsample a first depth image to a second depth image having expanded foreground area than the first depth image. The image processing apparatus may increase the resolution of the first depth image and may expand a foreground area of the first depth image by upsampling the first depth image using a dilation filter.

According to another embodiment, the image processing apparatus may upsample a first depth image to a second depth image, and may expand a foreground area of the second depth image by applying a dilation filter to the second depth image.

According to still another embodiment, the image processing apparatus may upsample a first depth image to a second depth image. Also, the image processing apparatus may apply a filter to remove an artifact from an edge area of the second depth image. Subsequently, the image processing apparatus may expand a foreground area of the filtered second depth image.

In operation 1402, the image processing apparatus predicts a color image using the second depth image.

In operation 1403, the image processing apparatus encodes the color image based on prediction. In this instance, the image processing apparatus may encode a size of a dilation filter used in resampling the first depth image.

The method of FIG. 14 may be described below in further detail.

The image processing apparatus may upsample a first depth image to a second depth image through inloop resampling, in a 3D video encoder.

Also, the image processing apparatus may perform a view synthesis prediction of a color image having the same or similar resolution as the second depth image using the upsampled second depth image, in the 3D video encoder.

The image processing apparatus may encode the color image based on prediction, in the 3D video encoder.

Figure 15:
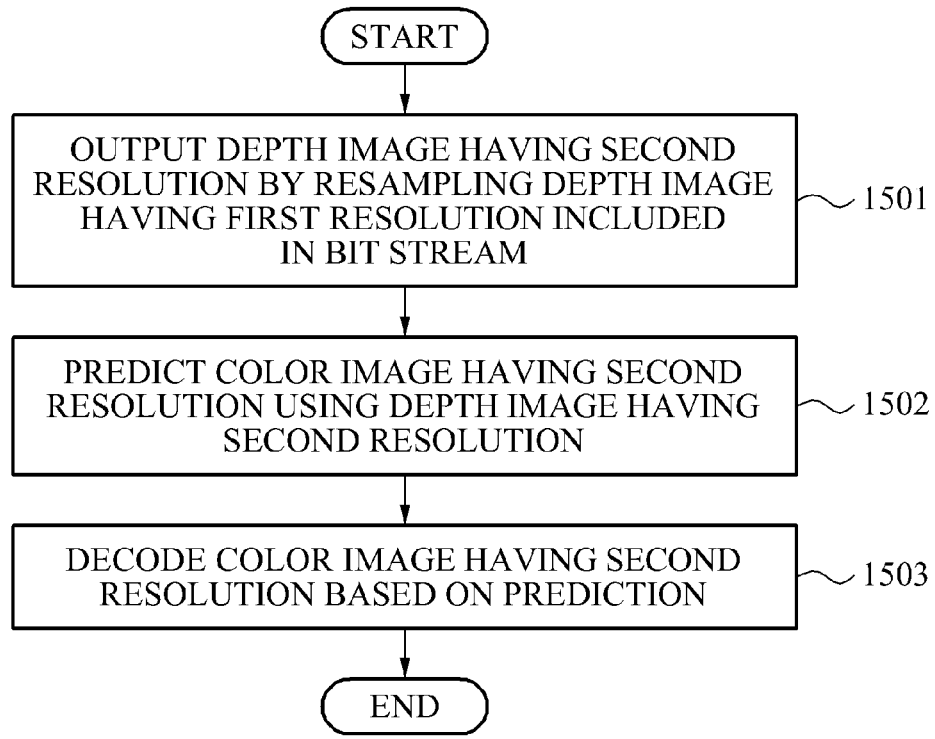
FIG. 15 illustrates an image processing method according to yet another example embodiment.

FIG. 15 illustrates an image processing method according to yet another example embodiment.

In FIG. 15, a first depth image may have a lower resolution than a second depth image. To generate a synthesized image of a virtual view, the second depth image may be synthesized with a color image having the same or similar resolution.

Referring to FIG. 15, in operation 1501, the image processing apparatus outputs a second depth image by resampling a first depth image extracted from a bit stream.

According to an embodiment, the image processing apparatus may upsample a first depth image to a second depth image having expanded foreground area than the first depth image. The image processing apparatus may increase the resolution of the first depth image and may expand a foreground area of the first depth image by upsampling the first depth image using a dilation filter.

According to another embodiment, the image processing apparatus may upsample a first depth image to a second depth image, and may expand a foreground area of the second depth image by applying a dilation filter to the second depth image.

According to still another embodiment, the image processing apparatus may upsample a first depth image to a second depth image. Also, the image processing apparatus may apply a filter to remove an artifact from an edge area of the second depth image. Subsequently, the image processing apparatus may expand a foreground area of the filtered second depth image.

In operation 1502, the image processing apparatus predicts a color image extracted from a bit stream, using the second depth image.

In operation 1503, the image processing apparatus decodes the color image having the same or similar resolution as the second depth image based on prediction.

The method of FIG. 15 may be described below in further detail.

The image processing apparatus may upsample a first depth image included in a bit stream to a second depth image through inloop resampling, in a 3D video decoder. Also, the image processing apparatus may perform a view synthesis prediction of a color image included in the bit stream, using the upsampled second depth image, in the 3D video decoder. Also, the image processing apparatus may decode the color image based on prediction, in the 3D video decoder.

Figure 16:
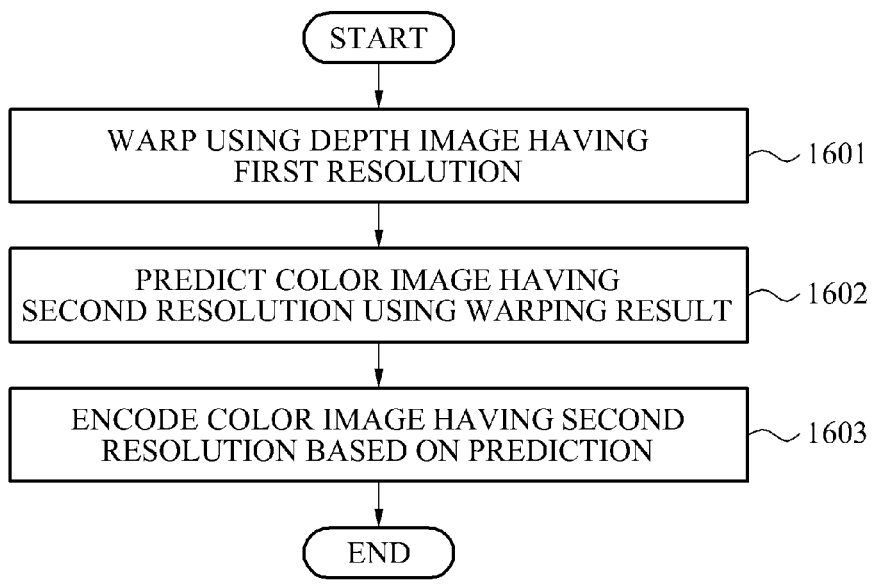
FIG. 16 illustrates an image processing method according to further another example embodiment.

FIG. 16 illustrates an image processing method according to further another example embodiment.

In FIG. 16, a depth image may have a lower resolution than a color image.

Referring to FIG. 16, in operation 1601, the image processing apparatus may warp a color image by referring to a depth image. When referring to pixels of the depth image during warping, the image processing apparatus may select a maximum pixel value among pixel values of depth images of adjacent views through a dilation filter. In this instance, the depth image may correspond to an encoded result.

Here, warping may refer to projecting the color image of a predetermined view to another view using the depth image and a camera parameter. Warping may be based on inverse projection of the color image or a reference image to a 3D space, followed by projection to a virtual view. When the depth image is used in warping, a maximum pixel value may be selected among pixel values of depth images of adjacent views through a dilation filter.

In operation 1602, the image processing apparatus may perform a view synthesis prediction based on the warping result of the color image.

In operation 1603, the image processing apparatus may encode the color image based on the view synthesis prediction.

Figure 17:
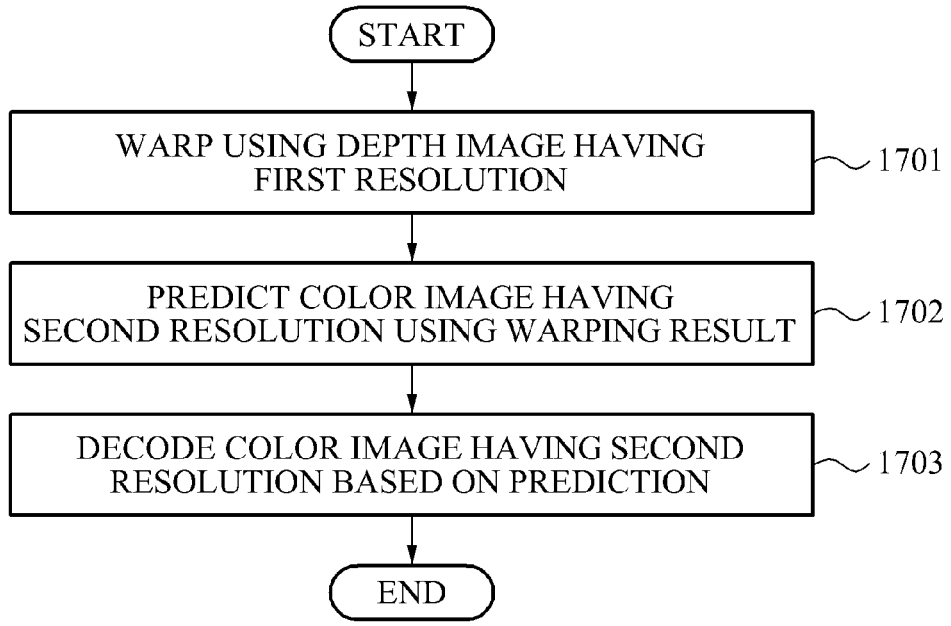
FIG. 17 illustrates an image processing method according to another example embodiment.

FIG. 17 illustrates an image processing method according to another example embodiment.

In FIG. 17, a depth image may have a lower resolution than a color image.

Referring to FIG. 17, in operation 1701, the image processing apparatus may warp a compressed color image by referring to a depth image reconstructed from a bit stream.

When referring to pixels of the depth image during warping, the image processing apparatus may select a maximum pixel value among pixel values of depth images of adjacent views through a dilation filter. In this instance, the depth image may correspond to an encoded result.

Here, warping may refer to projecting the color image of a predetermined view to another view using the depth image and a camera parameter. Warping may be based on inverse projection of the color image or a reference image to a 3D space, followed by projection to a virtual view. When the depth image is used in warping, a maximum pixel value may be selected among pixel values of depth images of adjacent views through a dilation filter.

In operation 1702, the image processing apparatus may perform a view synthesis prediction based on the warping result of the color image.

In operation 1703, the image processing apparatus may encode the color image based on the view synthesis prediction.

When the first depth image and the second depth image have the same resolution in FIGS. 12 through 15, upsampling of the first depth image may be unnecessary. For example, when the first depth image and the second depth image have the same resolution in FIGS. 12 through 15, a dilation filter may be applied to the first depth image directly absent upsampling so that the foreground area of the first depth image may be expanded.

Also, when the depth image and the color image have the same resolution in FIGS. 16 and 17, upsampling of the depth image may be unnecessary. For example, when the depth image and the color image have the same resolution in FIGS. 16 and 17, a dilation filter may be applied to the depth image directly absent upsampling so that the foreground area of the depth image may be expanded.

Figure 18:
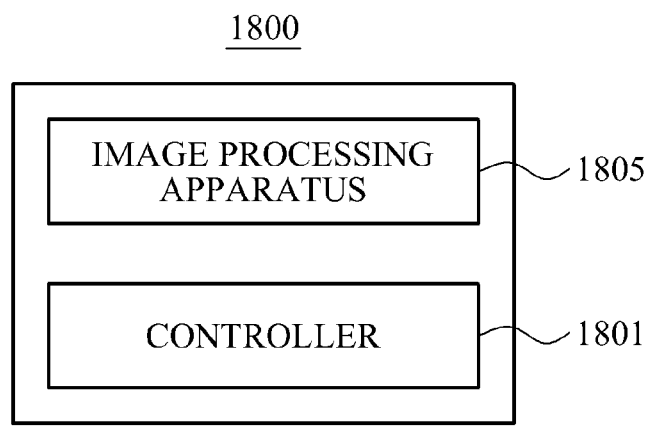
FIG. 18 illustrates a 3D display device 1800 including an image processing apparatus according to example embodiments.

FIG. 18 illustrates a 3D display device 1800 including an image processing apparatus according to example embodiments.

Referring to FIG. 18, the 3D display device 1800 may include, for example, a controller 1801 and an image processing apparatus 1805.

The 3D display device 1800 may be in the form of a 3D display for displaying a 3D image and may employ a multi-view scheme to output three or more different viewpoints. Alternatively, the multi-view display device 1800 may be in the form of a stereoscopic display outputting a left and right image. Examples of a 3D display may include a tablet computing device, a portable gaming device, a 3D television display or a portable 3D monitor such as in a laptop computer.

The controller 1801 may generate one or more control signals to control the 3D display device 1800 and to be displayed by the 3D display device 1800. The controller 1801 may include one or more processors.

The image processing apparatus 1805 may be used to generate a multi-view image for the 3D display device 1800 and may include, for example, an image identifying unit 1810, an upsampling unit 1820, an artifact processing unit 1830, and an area expanding unit 1840. None of items 1810-1840 are illustrated in FIG. 18. However, each of these units may correspond to similarly named units discussed herein, for example with respect to any of FIGS. 1-4, and therefore need not be discussed further here.

The image processing apparatus 1805 may be installed internally within the 3D display device 1800, may be attached to the 3D display device 1800, or may be separately embodied from the 3D display device 1800. Regardless of its physical configuration, the image processing apparatus 1805 has all of the capabilities discussed herein. The image processing apparatus 1805 may include one or more internal processors or may be controlled by the one or more processors included within the 3D display device 1800 such as the one or more processors of controller 1801.

The methods according to the above-described embodiments may be recorded in non-transitory computer-readable media including program instructions to implement various operations embodied by a computer or a processor. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more soft ware modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

According to example embodiments, a low-resolution depth image may be improved in resolution while maintaining the image quality, by applying a dilation filter, an interpolation filter, and a filter for removing an artifact to an upsampling operation.

Although one or more embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing method performed by a computer, the method comprising:
   identifying a first depth image;
   upsampling the first depth image to a second depth image having an increased number of pixels compared to the first depth image; and
   expanding a foreground area of the upsampled second depth image by applying a dilation filter to the upsampled second depth image,
   wherein the upsampling is performed by interpolating the first depth image,
   wherein the expanding of the foreground area of the upsampled second depth image comprises expanding the foreground area by applying a dilation filter having a size that is adjusted based on characteristic information of the first depth image, wherein the dilation filter determines a pixel value of a new pixel generated by upsampling, using a highest pixel value among a pixel value corresponding to neighbor pixels, and wherein a size of the dilation filter is determined based on a resolution of the first depth image.

2. An image processing method performed by a computer, the method comprising:

identifying a first depth image;

upsampling the first depth image to a second depth image by interpolating the first depth image; and expanding a foreground area of the second depth image, wherein the expanding of the foreground area of the second depth image comprises expanding the foreground area of the second depth image by applying a dilation filter to the second depth image, wherein the dilation filter determines a pixel value of a new pixel generated by upsampling, using a highest pixel value among a pixel value corresponding to neighbor pixels, and wherein a size of the dilation filter is determined based on a resolution of the first depth image.

3. The method of claim 2, further comprising: removing an artifact from an edge area of the second depth image.

4. The method of claim 2, wherein the interpolating of the first depth image comprises any of a linear interpolation, a Lanczos interpolation, and a cubic interpolation.

5. An image processing method performed by a computer, the method comprising:

outputting a second depth image by resampling a first depth image;

predicting a color image using the second depth image;

encoding the color image based on the prediction; and encoding a size of a dilation filter used in resampling the first depth image;

wherein the outputting of the second depth image by resampling the first depth image comprises:

upsampling the first depth image to the second depth image; and expanding a foreground area of the second depth image using a dilation filter, wherein the dilation filter determines a pixel value of a new pixel generated by upsampling, using a highest pixel value among a pixel value corresponding to neighbor pixels, and wherein a size of the dilation filter is determined based on a resolution of the first depth image.

6. The method of claim 5, wherein the outputting of the second depth image by resampling the first depth image further comprises:

applying a filter to remove an artifact from an edge area of the second depth image.

7. An image processing method performed by a computer, the method comprising:

outputting a second depth image by resampling a first depth image extracted from a bit stream;

predicting a color image extracted from the bit stream, using the second depth image; and decoding the color image based on the prediction, wherein the outputting of the second depth image by resampling the first depth image comprises:

upsampling the first depth image to the second depth image; and expanding a foreground area of the second depth image using a dilation filter, wherein the dilation filter determines a pixel value of a new pixel generated by upsampling, using a highest pixel value among a pixel value corresponding to neighbor pixels, and wherein a size of the dilation filter is determined based on a resolution of the first depth image.

8. The method of claim 7, wherein the outputting of the second depth image by resampling the first depth image further comprises:

applying a filter to remove an artifact from an edge area of the second depth image.

9. The method of claim 7, wherein the outputting of the second depth image by resampling the first depth image comprises resampling the first depth image based on a size of a dilation filter included in the bit stream.

10. An image processing method performed by a computer, the method comprising:

identifying a decoded depth image; and resampling the depth image to a resolution of a color image, through post-processing, when a resolution of the depth image is different from the resolution of the color image, wherein the resampling the depth image comprises:

upsampling the depth image to the resolution of the color image; and expanding a foreground area of the depth image using a dilation filter, wherein the dilation filter determines a pixel value of a new pixel generated by upsampling, using a highest pixel value among a pixel value corresponding to neighbor pixels, and wherein a size of the dilation filter is determined based on a resolution of the depth image.

11. An image processing method performed by a computer, the method comprising:

warping a color image by referring to a depth image;

performing a view synthesis prediction based on the warping result of the color image; and encoding the color image based on the view synthesis prediction, wherein the warping of the color image comprises selecting a maximum pixel value among pixel values of depth images of adjacent views for pixels of the color image.

12. An image processing method performed by a computer, the method comprising:

warping a compressed color image by referring to a first depth image reconstructed from a bit stream;

performing a view synthesis prediction based on the warping result of the color image; and decoding the color image based on the view synthesis prediction, wherein the warping of the color image comprises selecting a maximum pixel value among pixel values of depth images of adjacent views for pixels of the color image.

13. An image processing method performed by a computer, the method comprising:

identifying a first depth image;

upsampling the first depth image to a second depth image having an increased number of pixels compared to the first depth image, wherein the upsampling is performed by interpolating the first depth image; and outputting the second depth image having an expanded foreground area compared with the first depth image by applying a dilation filter to the upsampled second depth image, wherein the dilation filter determines a pixel value of a new pixel generated by upsampling, using a highest pixel value among a pixel value corresponding to neighbor pixels, and wherein a size of the dilation filter is determined based on a resolution of the first depth image.

14. An image processing apparatus, comprising:
a processor to control one or more processor-executable units;
an image identifying unit to identify a first depth image; and
an upsampling unit to upsample the first depth image to a second depth image having an increased number of pixels compared to the first depth image, wherein the upsampling is performed by interpolating the first depth image and applying a dilation filter to the interpolated first depth image,
wherein the dilation filter determines a pixel value of a new pixel generated by upsampling, using a highest pixel value among a pixel value corresponding to neighbor pixels, and
wherein a size of the dilation filter is determined based on a resolution of the first depth image.

15. An image processing apparatus, comprising:
a processor to control one or more processor-executable units;
an image identifying unit to identify a first depth image;
an upsampling unit to upsample the first depth image to a second depth image by interpolating the first depth image; and
an area expanding unit to expand a foreground area of the upsampled second depth image using a dilation filter,
wherein the dilation filter determines a pixel value of a new pixel generated by upsampling, using a highest pixel value among a pixel value corresponding to neighbor pixels, and
wherein a size of the dilation filter is determined based on a resolution of the first depth image.

16. The apparatus of claim 15, further comprising:
an artifact processing unit to remove an artifact from an edge of the upsampled second depth image, wherein the area expanding unit applies a dilation filter to the artifact-free second depth image.

17. An image processing apparatus, comprising:
a processor to control one or more processor-executable units;
a resampling unit to output an upsampled second depth image by resampling a downsampled first depth image;
a predicting unit to predict a color image using the second depth image; and
an image encoding unit to encode the color image based on the prediction,
wherein the resampling unit upsamples the first depth image to the second depth image; and expands a foreground area of the second depth image using a dilation filter,
wherein the dilation filter determines a pixel value of a new pixel generated by upsampling, using a highest pixel value among a pixel value corresponding to neighbor pixels, and
wherein a size of the dilation filter is determined based on a resolution of the first depth image.

18. The apparatus of claim 17, wherein the dilation filter has a size that is adjusted based on characteristic information of the first depth image.

19. An image processing apparatus, comprising:
a processor to control one or more processor-executable units;
a resampling unit to output an upsampled second depth image by resampling a downsampled first depth image included in a bit stream;
a predicting unit to predict a color image included in the bit stream using the second depth image; and
an image encoding unit to decode the color image based on the prediction,
wherein the resampling unit upsamples the first depth image to the second depth image; and expands a foreground area of the second depth image using a dilation filter,
wherein the dilation filter determines a pixel value of a new pixel generated by upsampling, using a highest pixel value among a pixel value corresponding to neighbor pixels, and
wherein a size of the dilation filter is determined based on a resolution of the first depth image.

20. An image processing apparatus, comprising:
a processor to control one or more processor-executable units;
a predicting unit to warp a color image by referring to a first depth image and to perform a view synthesis prediction based on the warping result of the color image; and
an image encoding unit to encode the color image based on the view synthesis prediction,
wherein the predicting unit performs warping the color image by selecting a maximum pixel value among pixel values of depth images of adjacent views for pixels of the color image.

21. An image processing apparatus, comprising:
a processor to control one or more processor-executable units;
a predicting unit to warp a compressed color image by referring to a first depth image reconstructed from a bit stream and to perform a view synthesis prediction based on the warping result of the color image; and
an image decoding unit to decode the color image based on the view synthesis prediction,
wherein the predicting unit performs warping the color image by selecting a maximum pixel value among pixel values of depth images of adjacent views for pixels of the color image.

22. An image processing apparatus, comprising:
a processor to control one or more processor-executable units;
an image identifying unit to identify a first depth image;
an upsampling unit to upsample the first depth image to a second depth image having an increased number of pixels compared to the first depth image, wherein the upsampling is performed by interpolating the first depth image; and
an image output unit to output the second depth image having an expanded foreground area compared with the first depth image using a dilation filter, wherein the first depth image has a resolution lower than or equal to the second depth image,
wherein the dilation filter determines a pixel value of a new pixel generated by upsampling, using a highest pixel value among a pixel value corresponding to neighbor pixels, and
wherein a size of the dilation filter is determined based on a resolution of the first depth image.

23. The apparatus of claim 22, further comprising:
an artifact processing unit to remove an artifact from an edge area of the first depth image, wherein the image output unit applies a dilation filter to the artifact-free first depth image.

24. A method of adjusting a depth image, the method comprising:
identifying a depth image having a lower resolution than a corresponding color image;
upsampling the depth image by interpolating the depth image to increase the resolution of the depth image when the depth image is determined as having a lower resolution than the corresponding color image; and
expanding, by way of a processor, a foreground area of the upsampled depth image by applying a dilation filter to the upsampled depth image,
wherein the dilation filter determines a pixel value of new pixel generated by upsampling, using a highest pixel value among a pixel value corresponding to neighbor pixels, and
wherein a size of the dilation filter is determined based on a resolution of the depth image.

25. The method of claim 24, wherein when the resolution of the depth image is determined as high, the image processing apparatus increases the size of the dilation filter and when the resolution of the depth image is determined as low, the image processing apparatus decreases the size of the dilation filter.

26. The method of claim 24, wherein when the depth image is determined as being derived from a depth video camera, the image processing apparatus increases the size of the dilation filter and when the depth image is determined as being calculated from a color image, the image processing apparatus decreases the size of the dilation filter.

27. A non-transitory computer-readable storage medium encoded with computer readable code comprising a program for implementing the method of claim 24.

28. A 3-dimensional display including an apparatus for generating multi-views, the 3-dimensional display comprising:
a processor to control one or more processor-executable units;
an image identifying unit to determine a depth image having a lower resolution than a corresponding color image; and
an upsampling unit to upsample the depth image for increasing the resolution of the depth image when the depth image is determined as having a lower resolution than the corresponding color image, and to expand a foreground area of the upsampled depth image by applying a dilation filter to the upsampled depth image,
wherein the dilation filter determines a pixel value of new pixel generated by upsampling, using a highest pixel value among a pixel value corresponding to neighbor pixels, and
wherein a size of the dilation filter is determined based on a resolution of the depth image.

29. The display of claim 28, wherein a size of the dilation filter is determined based on a resolution of a depth image.

* * * * *